US00RE34858E

United States Patent [19]

Kunreuther

[11] E Patent Number: Re. 34,858

[45] Reissued Date of Patent: Feb. 14, 1995

[54] BUTTON ATTACHER WITH VARIABLE NEEDLE SPACING

[76] Inventor: Steven J. Kunreuther, 285 Central Park West, New York, N.Y. 10024

[21] Appl. No.: 218,179

[22] Filed: Mar. 28, 1994

Related U.S. Patent Documents

Reissue of:

[64] Patent No.: 5,205,458
Issued: Apr. 27, 1993
Appl. No.: 858,960
Filed: Mar. 27, 1992

[51] Int. Cl.[6] ..... B65C 5/06; B25C 1/00

[52] U.S. Cl. ..... 227/71; 227/67; 227/101; 227/103

[58] Field of Search ..... 227/67, 68, 69, 71, 227/70, 101, 103, 120

[56] References Cited

U.S. PATENT DOCUMENTS

| | | | |
|---|---|---|---|
| 2,605,943 | 8/1952 | Hoefle . | |
| 2,707,783 | 5/1955 | Sullivan | 227/71 |
| 3,470,834 | 10/1969 | Bone . | |
| 3,650,452 | 3/1972 | Finke | 227/67 |
| 3,875,648 | 4/1975 | Bone . | |
| 4,039,078 | 8/1977 | Bone . | |
| 4,111,347 | 9/1978 | Bone . | |
| 4,187,970 | 2/1980 | Furutu | 227/67 |
| 4,281,782 | 8/1981 | Marsh . | |
| 4,296,698 | 10/1981 | Davidson et al. . | |
| 4,316,562 | 2/1982 | Davidson et al. . | |
| 4,361,101 | 11/1982 | Marsh . | |
| 4,367,834 | 1/1983 | Lozio | 227/67 |
| 4,533,076 | 8/1985 | Bourque . | |
| 4,969,589 | 11/1990 | Kim | 227/67 |

*Primary Examiner*—Scott A. Smith
*Attorney, Agent, or Firm*—James & Franklin

[57] ABSTRACT

Double "T" bar fasteners are dispensed through spaced needles which extend from different portions of the attacher housing. To attach a button, the needles are inserted through the thread holes of the button as it is held adjacent to the material to which it is to be attached. The housing portions are resiliently connected so that the portions can be moved relative to each other to vary the needle spacing and thus accommodate buttons with different hole spacing. The portions are biased to return to the original position. The portions may be halves of the housing connected by a living hinge. Internal compartments within each housing half enclose portions of fastener feed mechanism. The compartments are accessible when the housing is open to permit insertion of the parts and close when the housing halves snap-fit together. Each feed mechanism portion includes a spring loaded pawl with a tooth which normally engages an index wheel. The pawls are manually caused to travel along a path defined by oval guide tracks in the housing wall to cause the index wheels to simultaneously rotate and feed the fasteners.

29 Claims, 7 Drawing Sheets

BUTTON ATTACHER WITH VARIABLE NEEDLE SPACING

Matter enclosed in heavy brackets [ ] appears in the original patent but forms no part of this reissue specification; matter printed in italics indicates the additions made by reissue.

The present invention relates to apparatus designed to attach objects such as tags or buttons to garments or the like of the type which utilizes a hollow needle through which plastic fasteners are dispensed and more particularly to a button attacher which has dual dispensing needles the spacing between which can be varied to accommodate buttons with different hole spacing.

Attachers which dispense double "T" bar fasteners through fixed substantially parallel spaced hollow needles are known. The attacher which forms the subject of my U.S. Pat. No. 5,020,713, issued Jun. 4, 1991 and entitled "Assembly of Attachments and Device for Attaching Same" is an example. Although the attacher disclosed in my patent is not specifically designed for use in attaching buttons, it can be used for that purpose if the needle spacing is such that the needles can be inserted through the thread holes of the button. However, in that attacher, the spacing and orientation of the needles is fixed. Although the spacing between the thread holes of buttons of various sizes differs only to a relatively small extent, this different is significant enough to prevent an attacher with fixed needles from being using with many button sizes. It is a general object of the present invention to provide a double needle attacher which can accommodate buttons with holes having different spacing, which is simple in design, has relatively few parts which function reliably together and which can be assembled inexpensively and repaired easily.

Applicant is aware of U.S. Pat. No. 3,875,648 issued Apr. 8, 1975 and U.S. Pat. No. 4,111,347 issued Sep. 5, 1978 to Arnold Bone which disclose a table mounted, pneumatically driven double needle attacher. In the Bone device, the needles are mounted in members which are moveable relative to each other through an arc defined by a guide block. While these needle carrying members are position adjustable to accommodate different size stock, they are not resiliently connected to permit application of force on the housing to cause the needles to move relative to each other. Further, there is no means for biasing the members to return toward the original position.

What Bone discloses is a device for high volume industrial use. It requires careful and time consuming set up possible only in an industrial setting where the apparatus will be used repeatedly to attach many buttons of the same hole spacing. It is vastly different that a manually actuated hand held attacher of the present invention with resiliently connected housing portions, designed to be squeezed together against a bias to adjust the needle spacing each time the device is used, in order to accommodate buttons of different hole spacing.

Applicant is also aware of U.S. Pat. No. 4,533,076 issued Aug. 6, 1985 to D. Bourque in which a hand held double needle attacher is disclosed with needle mounting members pivotably mounted on a common shaft. The members are moveable relative to each other by loosening adjusting screws which can be move along slots in a plate. Like Bone, these needle mounting members are not housing portions resiliently connected to permit the device to be squeezed against a bias during each use to accommodate buttons with different hole spacing.

Many attachers, such as my patented attacher, have fastener feed mechanisms which are automatically actuated to feed fasteners, one at a time, into alignment with the needles, as the trigger is manipulated. This requires a relatively sophisticated mechanical linkage, significantly increasing the complexity of the device and hence the fabrication and assembly costs. In the present invention, I have sought to simplify the structure of the attacher, thereby reducing the cost of fabrication and assembly, by providing a simple, manually actuated feed mechanism which has few parts and is extremely easy to assemble and repair.

It is, therefore, a prime object of the present invention to provide a button attacher which can accommodate buttons with different hole spacing.

It is another object of the present invention to provide a button attacher with a housing formed of portions which are resiliently connected to permit relative movement of the needles.

It is another object of the present invention to provide a button attacher with a unitary housing formed of molded plastic housing halves connected by a living hinge.

It is another object of the present invention to provide a button attacher with a housing having internal compartments which are accessible when the housing is open and automatically close when the housing halves snap-fit together.

It is another object of the present invention to provide a button attacher with push rods mounted for relative movement.

It is another object of the present invention to provide a button attacher with a simplified feed mechanism.

In accordance with one aspect of the present invention, apparatus is provided for dispensing double "T" bar fasteners through spaced hollow needles. The apparatus comprises a housing from which the needles extend. Means are provided in the housing which are effective, when actuated to push the "T" bar ends of a fastener through the needles. The housing includes first and second portions. Each of the needles extends from a different one of the housing portions. Means are provided for resiliently connecting the housing portions to permit relative movement therebetween the alter the spacing between the needles.

The portions are moveable between a remote position and a proximate position. Means are provided for biasing the portions toward the remote position. The resilient connecting means preferably comprises the biasing means. In the preferred embodiment, the connecting means comprises the living hinge. However, other resilient connecting members or devices may also be used to achieve the intended result.

The apparatus includes means in the housing for feeding fasteners one at a time into alignment with the needles. The feed means includes first and second feed mechanism portions and means for simultaneously actuating the first and second feed mechanism portions. The first and second feed mechanism portions are situated within the first and second housing portions, respectively. Each of the housing portions includes a compartment within which the feed mechanism portion associated with that housing portion is at least partially situated.

Each of the housing portions comprises a side wall. Each of the compartments is defined in part by the side wall of the housing portion associated with that compartment and in part by an internal wall. Means are provided which extend from the side wall of the housing portion for releasably engaging one end of the internal wall.

A third compartment is provided between the feed mechanism compartments in the housing portions. The push means are at least partially situated within the third compartment. The third compartment is at least partially defined between the internal walls of the first and second housing portions.

Means are provided for releasably connecting the housing portions together. The releasable connecting means comprises an enlarged portion preferably in the form of substantially cylindrical means affixed to the edge of one of the housing portions and substantially arcuate means affixed to the edge of the other portion. The enlarged means are receivable within the acruate means to releasably connect the edges.

Trigger means are movably mounted on the housing. The push means includes track means situated in the housing. Push rod means are mounted for movement along track means. Means are provided for operably connecting the push rod means and the trigger means.

Means are provided for pivotally mounting the trigger means within, the housing for movement between rest and actuate positions. Means are provided for urging the trigger means towards the rest position.

The track means includes a substantially straight section situated substantially in the plane of the needles. The push rod means in moveable along the straight section of the track means. The track means also has an arcuate section. Means are provided for connecting the push rod means and the trigger means. These means are moveable along the arcuate section of the track means.

The track means comprises first and second tracks situated in the first and second housing portions, respectively. The means for connecting the push rod means and the trigger means comprises flexible means extending between the tracks. The flexible means is moveable along a path defined by the arcuate section, as the trigger means is actuated.

The push rod means comprises a push rod block. First and second push rods are provided. Means are provided for mounting the first and second push rods on the push rod block to permit relative movement of the push rods between a position where the push rods are substantially parallel to each other and a position where the push rods are inclined toward each other or between parallel positions of different spacing.

Each of the feed mechanism portions comprises a feed wheel situated to engage one end of a fastener. The wheel is rotatable to move the "T" bar associate with the engaged fastener end into alignment with a needle. Pawl means are provided in operative engagement with the feed wheels and are moveable to rotate same. Manually actuatable means are accessible from the exterior of the housing to move the pawl means. Spring means are situated between the pawl means and the housing.

The pawl means comprises a protrusion. The housing further comprises a guide track into which the protrusion is received. The track defines the path of movement of the pawl means.

In the preferred embodiment, the housing portions each comprise half of the housing. The resilient connecting means connects the top edge of the housing halves. Hence, the housing portions are preferably unitary and integral.

Releasable connecting means are situated along the bottom edge of the housing halves. The releasable connecting means preferably comprises snap-fit means.

In accordance with another aspect of the present invention, a fastener feed mechanism is provided for use in apparatus for dispensing fasteners through hollow needle means of the type including a housing from which the needle means extends. The feed mechanism includes index wheel means rotatably mounted in the housing to engage and move fasteners one at a time into alignment with the needle. Pawl means are provided with a first part adapted for operative engagement with the index wheel means and a second part. Guide track means are provided in the housing to guide the movement of a second part of the pawl means. Spring means are provided and are operative on the pawl means. A third part of the pawl means is accessible from the exterior of the housing. It is manually manipulatable to cause the second part of the pawl means to move along a first portion of the track means, against the urging of the spring means, to cause the first part to disengage the index wheel means and therefore, to move along a second portion of the track means, to cause the first part to re-engage and rotate the index wheel means, as the pawl means is urged toward its original position by the spring means.

The track means has a substantially oval shape. The oval has a major axis. The major axis forms an obtuse angle with the plane of push rod movement.

The housing has a bottom wall. The spring means extends between the bottom wall and the pawl means.

In accordance with another aspect of the present invention, apparatus is provided for dispensing double "T" bar fasteners through first and second spaced hollow needles. The apparatus comprises a housing upon which the needles are mounted. Means are provided for mounting the needles on the housing for movement relative to each other between first and second positions. Means are provided for pushing a fastener through the needles, upon actuation of the apparatus. The push means comprises a moveable push rod block. First and second push rods are provided, one for each needle. Means are provided for mounting the push rods on the block to permit the rods to move relative to each other between a first relative position wherein each rod is aligned with a different needle in its first position and a second relative position wherein each rod is aligned with a different needle in its second position to maintain alignment with the needles.

The needles are moveable between parallel and non-parallel positions. The push rods are likewise moveable between parallel and non-parallel orientations or parallel positions of different spacing to accommodate the change in position of the needles.

The push block comprises an opening elongated in a direction transverse to the direction of movement of the push means. Each of the push rods has a portion which is moveably received within one of the elongated openings.

The portion of the push rod which is received in the opening is substantially perpendicular to the remainder of the rod. The rod further includes a portion substantially parallel to the remainder of the push rod but is situated on the opposite side of the push rod block.

To these and such other objects which may hereinafter appear, the present invention relates to a button attacher with variable needle spacing, as set forth in the following specification and recited in the annexed claims, taken together with the accompanying drawings, wherein like numerals refer to like parts and in which:

Figure 1:
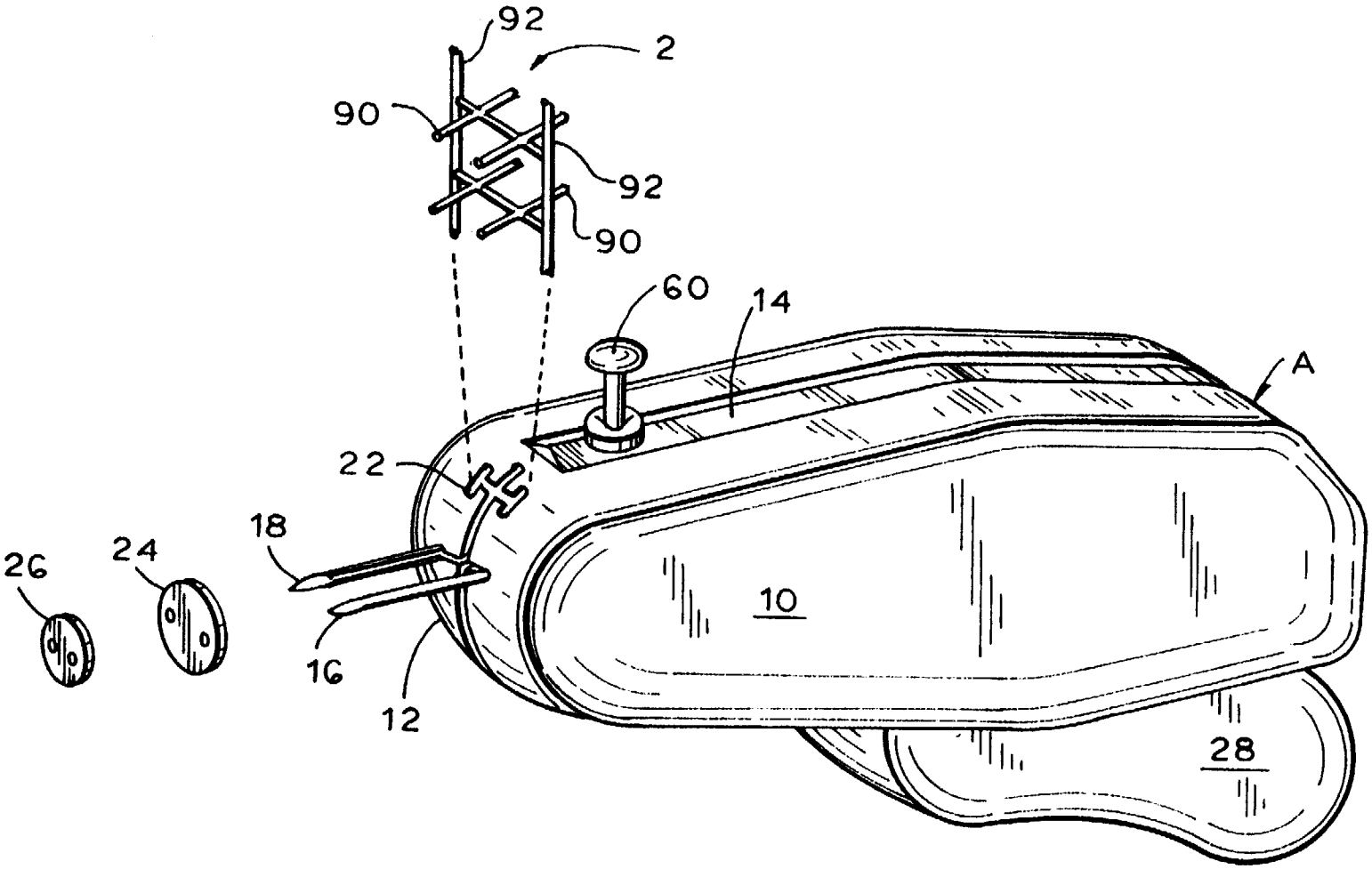
FIG. 1 is an isometric view of the button attacher of the present invention.
Figure 2:
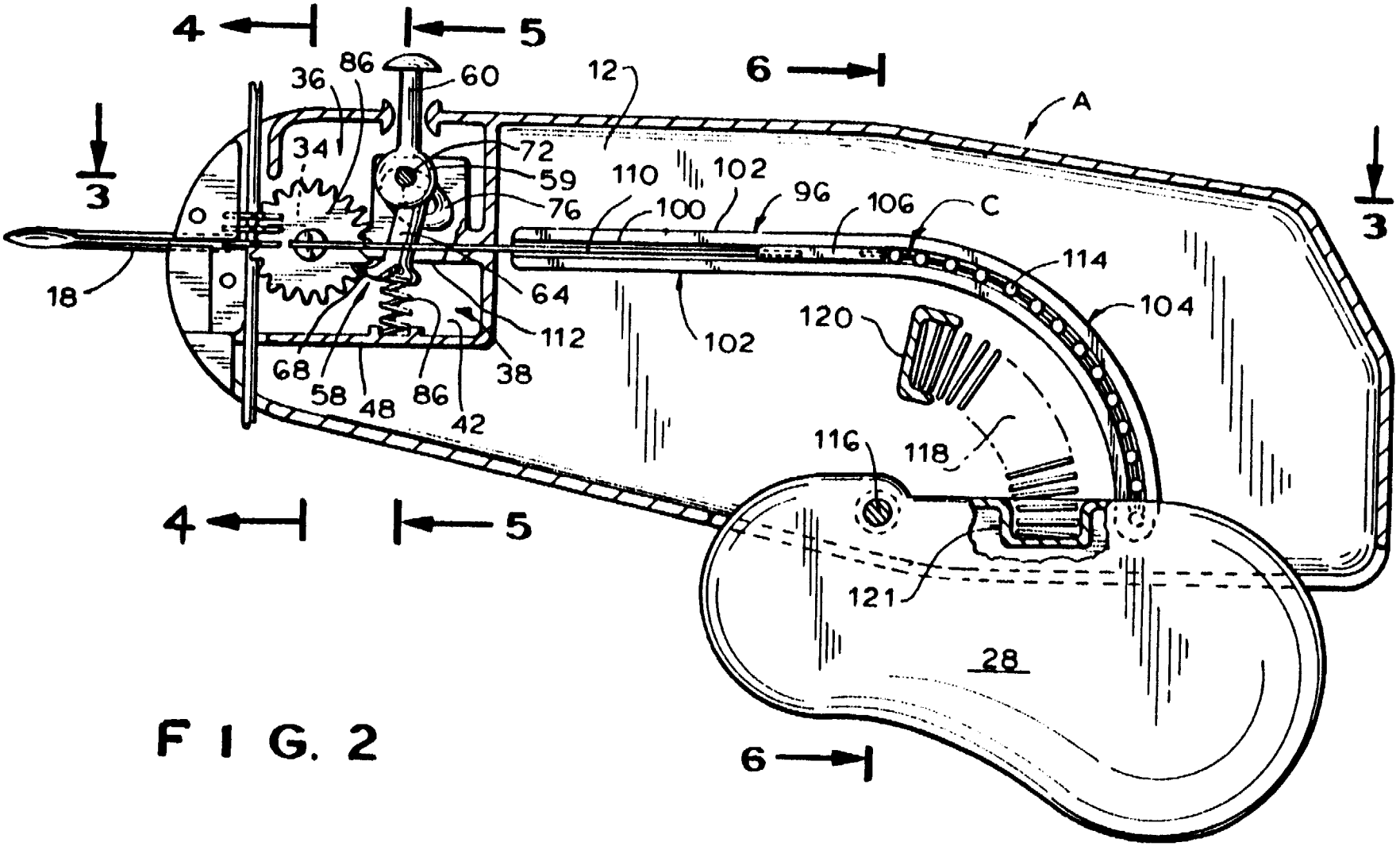
FIG. 2 is a side cross-sectional view of the attacher of FIG. 1.
Figure 4B:
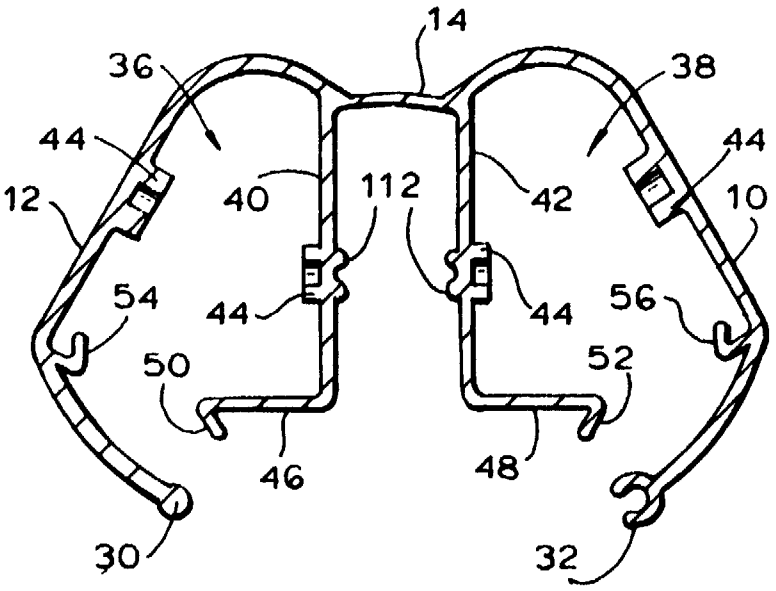
Figure 4A:
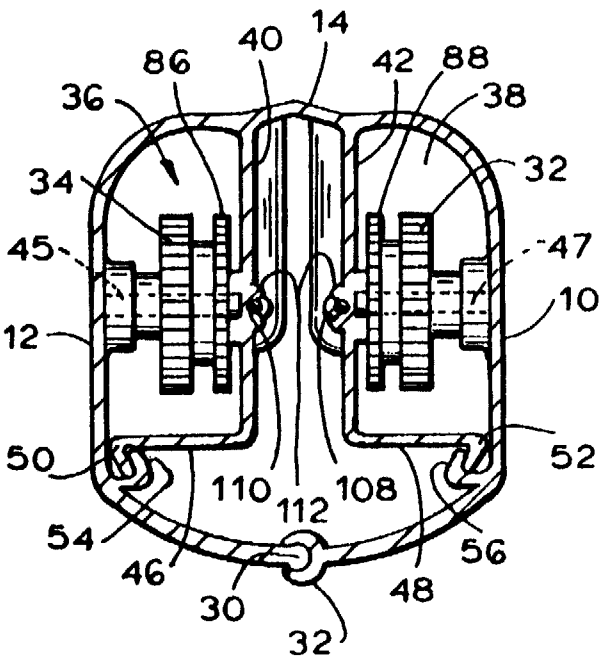
Figure 6:
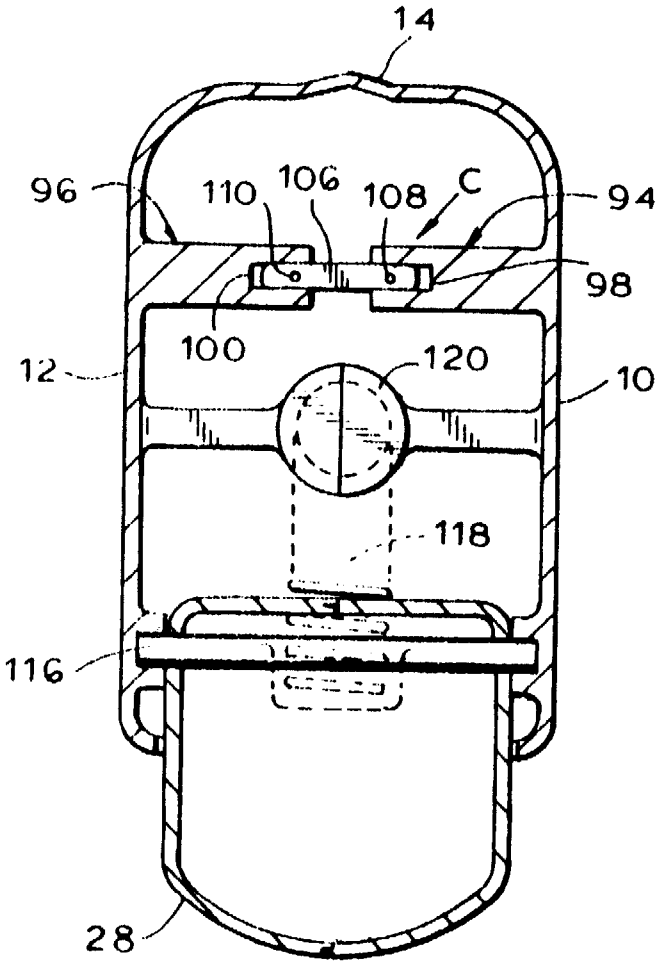
Figure 5:
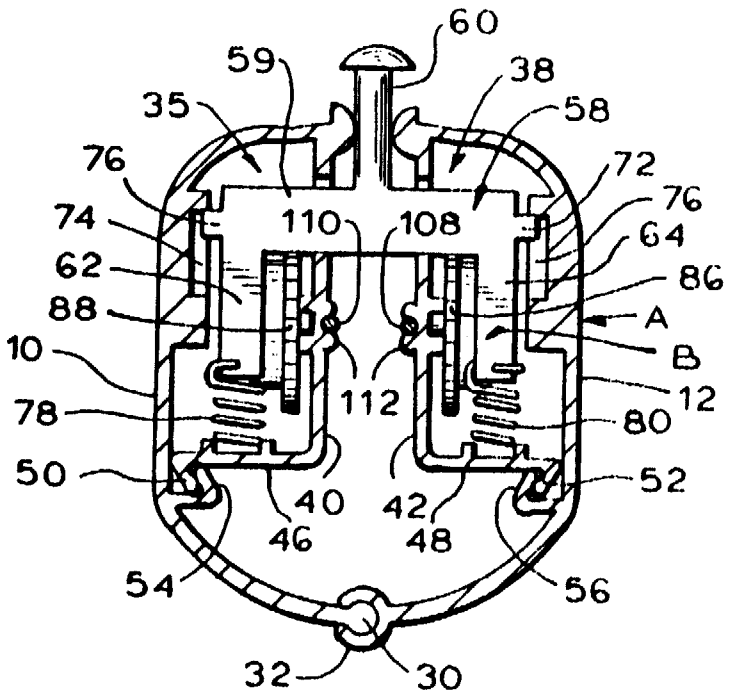
Figure 7:
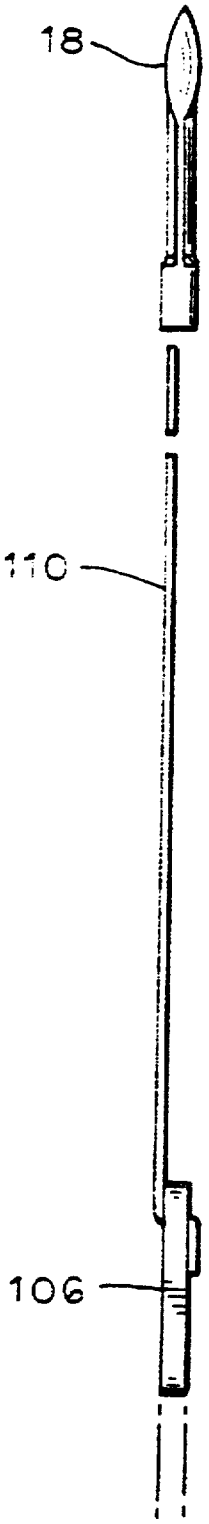
Figure 8:
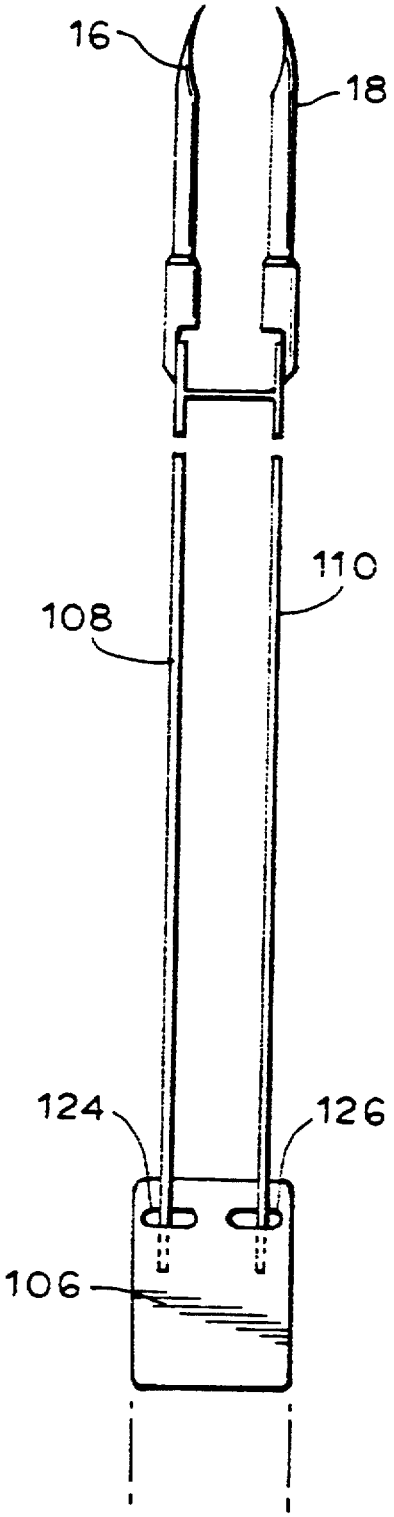
Figure 9:
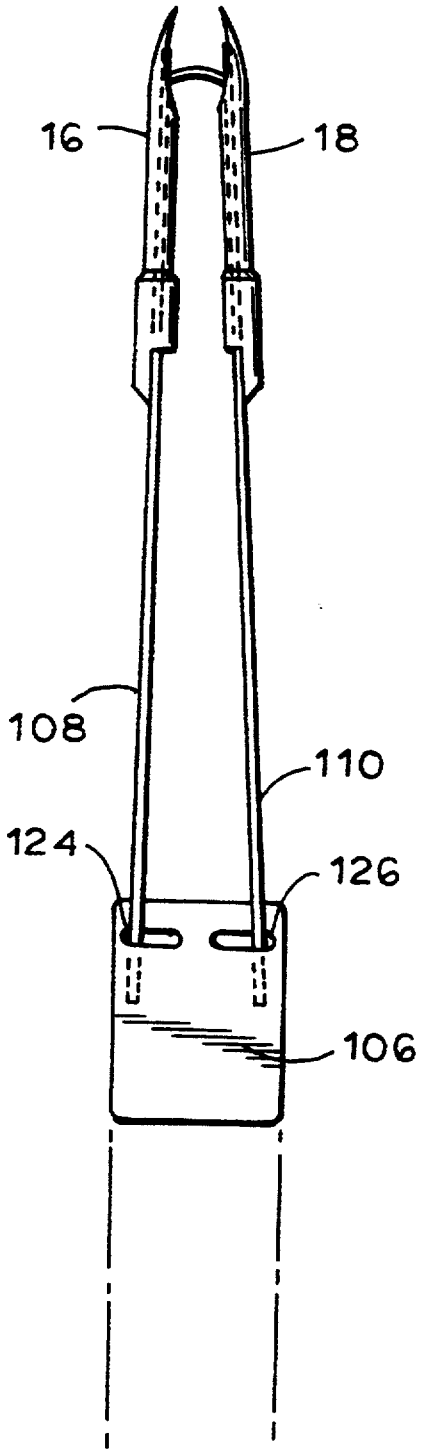

FIGS. 4*a* and 4*b* are cross-sectional view taken along line 4—4 of FIG. 2 showing a portion of the attacher in the closed and open positions respectively;

FIG. 5 is a cross-sectional view taken along line 5—5 of FIG. 2;

FIG. 6 is a cross-sectional view taken along line 6—6 of FIG. 2;

FIG. 7 is a side view of the push block and push rods;

FIG. 8 is a top view of the push block showing the push rods in their initial parallel orientation;

FIG. 9 is a view similiar to FIG. 8 but with the rods shown in a non-parallel orientation.

Figure 10:
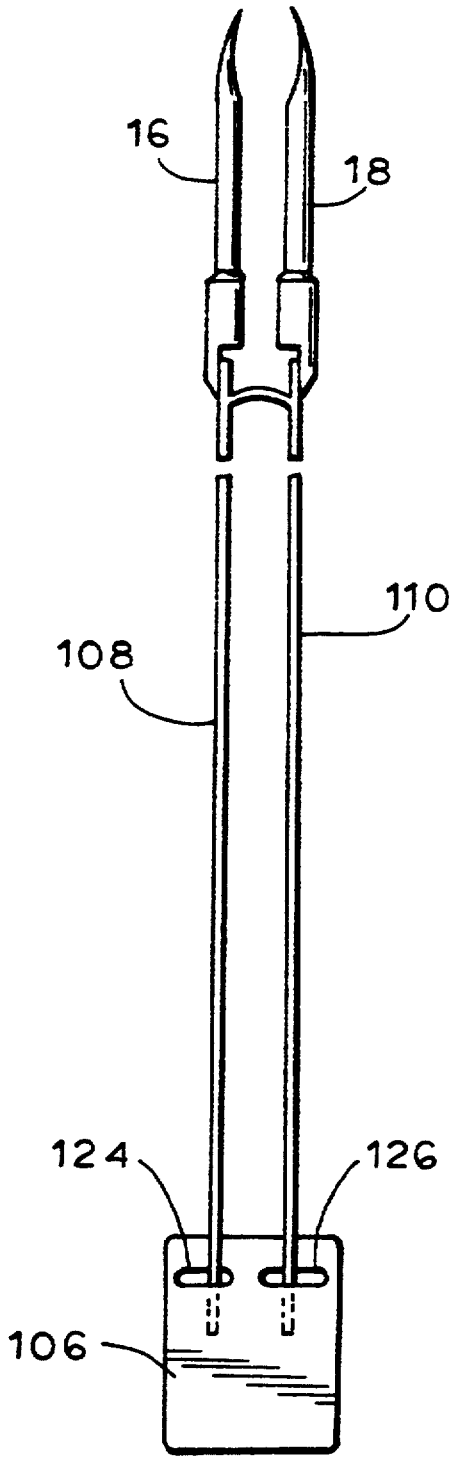

FIG. 10 is a view similar to FIG. 8 but with the rods in a closely spaced parallel orientation.

As shown in the drawings, the attacher of the present invention includes an unitary housing, generally designed A, formed of mirror image plastic molded housing halves 10, 12 which are resiliently connected along the top edge of the housing by a living hinge 14. First and second hollow steel or steel and plastic needles 16, 18 of conventional design extend from the front of halves 10, 12 respectively. A clip of double "T" bar fasteners 20 is received in a "H" shaped slot 22 in the housing. Each fastener, in turn, is positioned behind needles 16, 18, and the "T" bars are pushed simultaeously through the needles to dispense the fastener.

The attacher is especially designed for affixing buttons to garments on other soft material. Two different size buttons 24, 26, are illustrated with thread holes which are differently spaced. The attacher of the present invention can accommodate buttons with differently spaced holes by altering the spacing between the needles.

In order to attach a button, the needles are inserted through the thread holes in the button and then penetrate the material against which the button is held. The attacher is actuated by depressing a trigger 28 to eject the fastener through the needles such that the "T" bar ends lodge on the far side of the material, with the connecting thin stretched filament extending through the thread holes of the button.

In order to accommodate buttons 24, 26 with differently spaced thread holes, the operator simply squeezes the housing such that the halves 10, 12 move toward each other, against the spring-like action of the living hinge 14, to vary the spacing and orientation of needles 16 and 18 to accommodate the spacing between the thread holes of the particular button being attached. After the fastener is dispensed and the needles withdrawn, the housing halves 10, 12 are released and return to their normal relative positions.

Aside from permitting variable spacing, hinge 14 permits the housing halves to be produced integrally, open easily to permit assembly and repair of the internal mechanical parts and snap-fit together to close the housing, as described in detail below. As best seen in FIG. 6 4A and 4B, the bottom edge of the housing halves are provided with a "snap fit" or "friction fit" closure mechanism. Preferably, this takes the form of a cylindrical enlargement or bead 30 along the bottom edge of half 12 and a reciprocally shaped recess defined by flexible members 32 along the buttom edge of half 10. This closure mechanism permits the housing halves to snapfit together or open, a needed, in a simple manner. No screws or other locking devices are required.

As best seen in FIGS. 2, 3, 5 and 6, inside housing A is situated a fastener feed mechanism, generally designated B and an ejector mechanism, generally designated C. Feed mechanism B includes a pair of index wheels 32, 34 one of which is situated in each housing half and more specifically, within a feed mechanism compartment 36, 38 in each half. As best seen in FIGS. 4A and 4B, each compartment 36, 38 is defined between an internal housing wall 40, 42 and the interior of the housing half. The internal wall 40, 42 of each compartment is provided with a protrusion 44 defining a recess into which the end of a shaft 46, 48 is rotatably received. Shafts 45, 48 carry index wheels 32, 34 respectively.

The housing and hence compartments 36 and 38 are open prior to installation of the feed mechanism, as shown in FIG. 4B. After the feed mechanism parts are installed, the housing halves are closed, as shown in FIG. 4A. Each compartment 36, 38 has a bottom wall 46, 48 substantially perpendicular to and extending outwardly from the lower edge of each internal wall 40, 42. Each bottom wall 46, 48 is provided a lip 50, 52 which, when the housing halves are closed, is engaged by an oppositely oriented lip 54, 56 extending from the interior of halves 12, 10, respectively. Thus, closing the housing halves automatically closes the feed mechanism compartments 36, 38 as seen in FIG. 4A.

Feed mechanism B includes a bifurcated pawl member 58 (FIG. 5). A depressible element 60, which is accessible from the top of housing A, forms one portion of member 58. Element 60 extends upwardly from a transverse portion 59 of member 58. Portion 59 extends laterally into both of the compartments 36, 38. Extending downwardly from the ends of transverse portion 59 are pawls 62, 64 which are situated in compartments 36, 38 respectively. As seen in FIG. 2, each pawl 62, 64 is provided with a tooth 66, 68 which is proximate to the index wheel 32, 34 in that compartment.

Extending outwardly from the ends of transverse portion 59, beyond the pawls, are protrusions 70, 72. Protrusions 70, 72 are received in oval shaped guide tracks 74, 76 in the interior of the respective housing walls. As seen in FIG. 2, each track 74, 76 has a major axis which is inclined at an obtuse angle with the plane of the needles. A spring 78, 80 is associated with each pawl 62, 64 respectively and is situated between wall 46, 48 and the bottom of the pawl so as to urge the member 58 towards the top of the housing, as seen in FIG. 2.

When element 60 is depressed, pawls 62, 64 move downwardly and rearwardly (toward the right as seen in FIG. 2) as protrusions 70, 72 have along the upper half of guide tracks 74, 76, compressing springs 78, 80. This causes teeth 66, 68, which are normally held in engagement with wheels 32 and 34 respectively, to disengage from the wheels as member 58 moves downwardly. As element 60 is released, pawls 62, 64 move forwardly and upward, along the lower portion of the oval tracks 74, 76, due to the action of springs 78, 80, causing teeth 66, 68 to re-engage wheels 32, 34 and rotate the wheels a small amount in a counterclockwise directions, as seen in FIG. 2.

Figure 3:
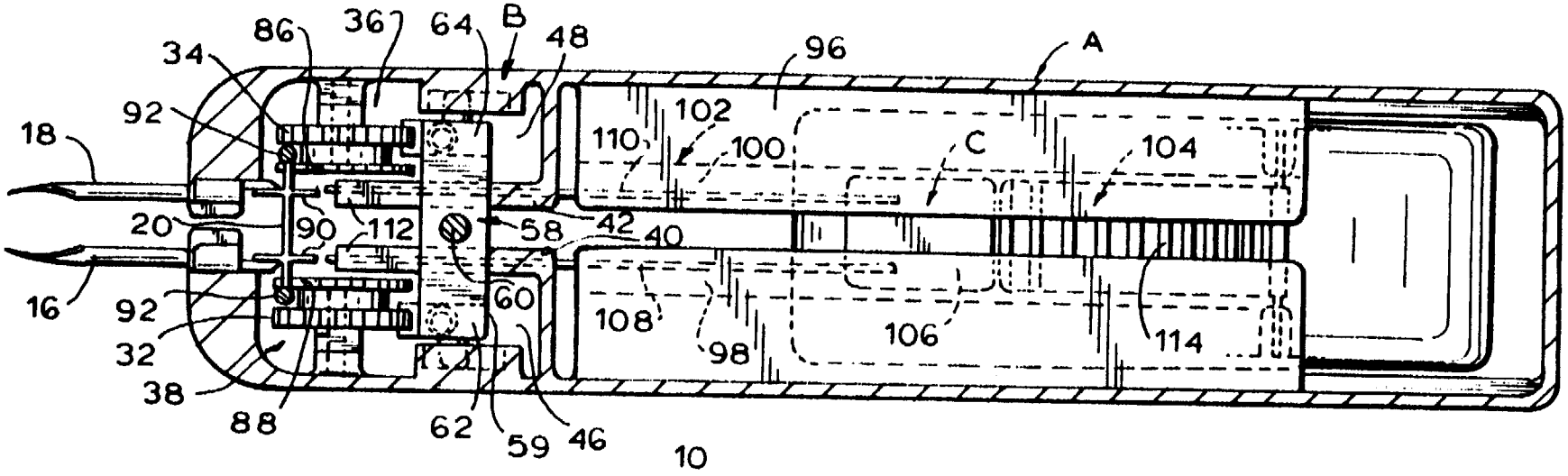
FIG. 3 is a cross-sectional view taken along line 3—3 of FIG. 2.

As seen in FIG. 3 each index wheels 32, 34 includes, at a location spaced along the shaft to which it is mounted, a gear wheel 86, 88. Gear wheels 86, 88 are aligned with slot 22 so as to engage each end of a fastener 20 at a point between the "T" bar 90 and the associated runner bar 92. As the index wheels and hence the gear wheels are rotated, each fastener 20, in turn, is engaged and brought into alignment behind needles 16, 18.

The ejector mechanism C includes inwardly extending elements 94, 96 on housing halves 10, 12 respectively, which define a pair of tracks 98, 100. As best seen in FIG. 2, these tracks have a straight section 102 in the plane of needles 16, 18 and an arcuate section 104 extending downwardly and away from the plane of the needles.

Received in the tracks 98, 100, for movement along the straight section 102, is a push rod block 106. A pair of spaced metal push rods 108, 110 extend forwardly from block 106 in alignment with the needles. Rods 108, 110 pass along guides 122 on the interior of walls 40, 42 (see FIG. 5). As block 106 is moved forward from the position illustrated in FIG. 2, rods 108, 110 push the aligned "T" bars 90 of a fastener 20 through needles 16, 18 as the runner bars 92 are severed from the fastener by a knife (not shown).

block 106 is moved along tracks 98, 100 by a flexible member 114 situated in the arcuate section 104 of the tracks. Member 114 extends between and connects block 106 and trigger 28. Trigger 28 is pivotally mounted in housing A for movement about a shaft 116. A spring 118 is provided to urge trigger 28 towards the rest position, as seen in FIG. 2. Spring 118 extends between a cup 120 formed in the housing and a cup 121 in the top surface of trigger 28.

As trigger 28 is depressed into a recess in the housing provided for that purpose, compressing spring 118 member 114 is moved along the arcuate track section 104, moving block 106 forward along straight track section 100 thereby causing rods 108, 110 to push the "T" bars 90 of a fastener through needles 16, 18. When the trigger is released spring 118 returns the trigger and the ejector mechanism C to its rest state. Thereafter, element 60, accessible from the top of the housing, is depressed to cause the next fastener 20 to align with the needles.

Push rods 108 and 110 are made of metal and hence will flex to some extent to accommodate the needles as the spacing and/or orientation of the needles changes. However, to insure sufficient relative movement of the rods, the rods are preferably movably mounted on the push block 106 as illustrated in FIGS. 7, 8 and 9.

Block 106 is provided with two spaced elongated slots 124, 126 which extend in a direction transverse to the direction of block movement. Each rod 108, 110 is provided with a "Z" shaped end portion consisting of a section bent perpendicular to the main portion of the rod, which extends through the slot, and a section parallel to the remainder of rod, which extends along the bottom of the block. This configuration permits the rods to move relative to the block and to each other between a parallel position (FIG. 8) and a non-parallel position (FIG. 9), or a closer parallel position (FIG. 10) as the needles change spacing and/or orientation.

It will now be appreciated that the present invention relates to a button attacher with a unitary housing having molded plastic halves resiliently connected to be moved relative to each other to vary the needle spacing and permit the apparatus to accommodate buttons with different hole spacing. The housing halves snap-fit together to permit access to the interior compartments for easy assembly and repair. A unique manually operated feed mechanisms is provided which includes a pawl member with oval path of travel defined by guide tracks such that it disengages the index wheels, moves relative to the wheels and then re-engages the wheels to simultaneously index same to feed fasteners into alignment with the needles. Flexible push rods are moveably mounted to accommodate the needles as they change spacing and/or orientation.

While only a ingle preferred embodiment has been disclosed for purposes of illustration, it is obvious that many variations and modifications could be made thereto. It is intended to cover all of these variations and modifications which fall within the scope of the present invention, as defined by the following claims:

I claim:

1. Apparatus for dispensing double "T" bar fasteners through spaced hollow needles, the apparatus comprising a housing from which the needles extend, means in said housing, effective when actuated, to push the "T" bar ends of a fastener through the needles, said housing comprising first and second portions, a different one of the needles extending from each of said housing portions, means for resiliently connecting said housing portions to permit relative movement of said housing portions from a remote position toward a proximate position to alter the spacing between the needles when external forces are applied to said housing portions and for biasing said housing portions toward said remote position to permit said housing portions to return to said remote position when said external forces are released, said push means comprising first and second spaced push rods, means for simultaneously moving said rods to push the "T" bar ends through the needles and means for mounting said rods to said moving means to permit the relative position of said rods to change, as said housing portions moe between said remote and proximate positions, so as to accommodate the alterations in needle spacing.

2. The apparatus of claim 1 wherein said resilient connecting means comprises a living hinge.

3. The apparatus of claim 1 further comprising means in said housing for feeding fasteners one at a time into alignment with the needles, said feed means comprising first and second feed mechanism portions and means for substantially simultaneously actuating said first and second feed mechanism portions.

4. The apparatus of claim 3 wherein said first and second feed mechanism portions are situated within said first and second housing portions, respectively.

5. The apparatus of claim 4 wherein each of said housing portions comprises a compartment within which the feed mechanism portion associated with said housing portion is situated.

6. The apparatus of claim 5 wherein each of said housing portions comprises a side wall and each of said compartments is defined, in part, by said side wall of said housing portion associated with said compartment and in part of an internal wall of said housing portion.

7. The apparatus of claim 6 further comprising means extending from said side wall of said housing portion for releasably engaging said internal wall.

8. The apparatus of claim 5 further comprising a third compartment at least a portion of which is situated between said feed mechanism compartments, said push means being at least partially situated within said third compartment.

9. The apparatus of claim 8 wherein said third compartment is at least partially defined by said internal walls of said first and second housing portions.

10. The apparatus of claim 3 wherein each of said feed mechanism portions comprises index wheel means situated to engage one end of a fastener and rotatable to move the "T" bar associated with said engaged end into alignment with one of said needles, pawl means in operative engagement with said wheel means and movable to rotate same, manually actuatable means, accessible from the exterior of said housing, for moving said pawl means and spring means situated between said pawl means and said housing.

11. The apparatus of claim 10 wherein said pawl means comprises protrusion means and said housing further comprises guide track means into which said protrusion means are received, said guide track means defining the path of travel of said pawl means.

12. The apparatus of claim 1 further comprising means for releasably connecting the edges of said housing portions.

13. The apparatus of claim 12 wherein said releasable connecting means comprises snap-fit means.

14. The apparatus of claim 1 further comprising trigger means movably mounted on said housing and track means situated in said housing, said push rods mounted for movement along said track means, and means for operably connecting said push rods and said trigger means.

15. The apparatus of claim 14 further comprising means for pivotally mounting said trigger means to said housing for movement between rest and actuate positions and means for urging said trigger means towards said rest position.

16. The apparatus of claim 14 wherein said track means comprises a substantially straight section substantially in the plane of said needles, said push rods being moveable along said straight section of said track means.

17. The apparatus of claim 14 wherein said track means has an arcuate section and wherein said means for connecting said push rods and said trigger means is movable along said arcuate section.

18. The apparatus of claim 16 wherein said track means comprises first and second tracks situated in said first and second housing portions, respectively and wherein said means for connecting said push rods and said trigger means comprises flexible means extending between said tracks and being movable along a path defined by said arcuate section as said trigger means is actuated.

19. The apparatus of claim 14 further comprising a push rod block, and means for mounting said first and second push rods on said push rod block to permit relative movement of said push rods between a position wherein said push rods are substantially parallel to each other and a position wherein the push rods are inclined with respect to each other.

20. The apparatus of claim 1 wherein said housing portions each comprise half of the housing.

21. The apparatus of claim 1 wherein said housing is unitary.

22. The apparatus of claim 1 wherein said rod moving means comprises a block moveable in a direction toward the needles, a slot in said block extending in a direction substantially perpendicular to said direction and further comprising means on one of said rods which is moveably received in said slot for movement in said substantially perpendicular direction.

23. The apparatus of claim 22 wherein said one rod has a main portion extending in said direction and wherein said moveably received means comprise a portion which is bent relative to said main portion.

24. The apparatus of claim 1 wherein said rod moving means comprises a block moveable in a direction toward the needles, first and second slots in said block associated with said first and said second rods, respectively, extending in a direction substantially perpendicular to said direction and further comprising means on each of said rods which are moveably received in said respective slots for the movement in said substantially perpendicular direction.

25. The apparatus of claim 24 wherein each of said rods has a main portion extending in said direction and wherein said moveable received means comprises a portion which is bent relative to said main portion.

26. The apparatus of claim 1 wherein the needles may move from a substantially parallel position to a non-parallel position as said housing portions move from said remote position toward said proximate position and wherein the relative position of said rods changes from a substantially parallel position to non-parallel position as housing portions move.

27. The apparatus of claim 1 further comprising first and second means mounted on said first and second housing portions, respectively, in accordance with the relative position of said housing portions.

28. The apparatus of claim 27 wherein said first and second rod positioning means comprise guide means.

29. Apparatus for dispensing double "T" bar fasteners through spaced hollow needles, the apparatus comprising a housing from which the needles extend, means in said housing effective when actuated, to push the "T" bar ends of a fastener through the needles, said housing comprising first and second portions, a different one of the needles extending from each of said housing portions and means for resiliently connecting said housing portions to permit relative movement of said housing portions to alter the spacing between the needles, means in said housing for feeding fasteners one at a time into alignment with the needles, said feed means comprising first and second feed mechanism portions and means for substantially simultaneously actuating said first and second feed mechanism portions, said first and second feed mechanism portions being situated within said first and second housing portions, respectively, each of said housing portions comprising a compartment within which the feed mechanism portion associated with said housing portion is situated, each of said housing portions comprising a side wall, each of said compartments being defined, in part, by said side wall of said housing portion associated with said compartment and in part by an internal wall of said housing portion, and further comprising means extending from said side wall of said housing portion for releasably engaging said internal wall.

* * * * *